(12) United States Patent
Davidson

(10) Patent No.: US 6,785,690 B1
(45) Date of Patent: Aug. 31, 2004

(54) METHOD AND SYSTEM FOR STORAGE, RETRIEVAL, AND QUERY OF OBJECTS IN A SCHEMELESS DATABASE

(75) Inventor: Thomas J. Davidson, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1409 days.

(21) Appl. No.: 08/819,536

(22) Filed: Mar. 17, 1997

Related U.S. Application Data

(60) Provisional application No. 60/013,633, filed on Mar. 18, 1996.

(51) Int. Cl.[7] .......................... G06F 17/00; G06F 17/30
(52) U.S. Cl. ............................. 707/103 Y; 707/103 R; 707/3
(58) Field of Search ....................... 707/3, 103, 103 R, 707/103 Y; 395/353, 670; 719/312

(56) References Cited

U.S. PATENT DOCUMENTS

| | | | | |
|---|---|---|---|---|
| 4,897,782 A | * | 1/1990 | Bennett et al. ............... | 707/10 |
| 5,077,658 A | * | 12/1991 | Bendert et al. ................. | 707/1 |
| 5,119,475 A | * | 6/1992 | Smith et al. ................. | 395/353 |
| 5,181,162 A | * | 1/1993 | Smith et al. ................. | 395/792 |
| 5,206,951 A | * | 4/1993 | Khoyi et al. ................. | 395/683 |
| 5,280,610 A | * | 1/1994 | Travis, Jr. et al. .......... | 707/103 |
| 5,341,478 A | * | 8/1994 | Travis, Jr. et al. ...... | 395/200.33 |
| 5,590,327 A | * | 12/1996 | Biliris et al. ................. | 395/670 |
| 5,680,452 A | * | 10/1997 | Shanton .......................... | 380/4 |
| 5,717,924 A | * | 2/1998 | Kawai ......................... | 707/102 |

FOREIGN PATENT DOCUMENTS

EP          0483036 A2  *  4/1992    ............. G06F/9/44

OTHER PUBLICATIONS

WO 9621324, Finni, Jul. 11, 1996.*

* cited by examiner

*Primary Examiner*—Uyen Le

(57) ABSTRACT

A mechanism for storing, retrieving, and querying data items or other information in the form of object instances created from object oriented programming environment.

5 Claims, 3 Drawing Sheets

METHOD AND SYSTEM FOR STORAGE, RETRIEVAL, AND QUERY OF OBJECTS IN A SCHEMELESS DATABASE

This application claims the benefit at provisional application No. 60/013,633 filed on Mar. 18, 1996.

NOTICE REGARDING COPYRIGHT RIGHTS

A portion of the disclosure of this patent document contains material that is subject to copyright protection. The copyright owner has no objection to the facsimile reproduction by anyone of the patent document or the patent disclosure, as it appears in the Patent and Trademark Office file or records, but otherwise reserves all copyright rights whatsoever.

BACKGROUND OF THE INVENTION

The present invention relates to database storage mechanisms for use by a data processing system, and in particular to a database system capable of storing a variety of pieces of information without regard to the specific structure of the information or how it is stored.

Database management systems are often rigidly structured to accept and store pieces of related information in a predefined format. The format, often referred to as the system's schema, is designed to accept the information only in a particular form. If the form of that information changes, the schema must be changed to accommodate the new form; and the prior stored information may also need to be modified to fit the new schema. Neither task is insubstantial.

Also, it is sometimes desirable to associate auxiliary behavior or action to the specific operations of the management mechanism of the database system. For example, suppose the available functions of the management mechanism included "get," "put," and "remove" operations to respectively retrieve (get) specific information, store (put) a piece of information in, or to delete (remove) information from the database system. Also, it may be desirable to associate with a request for a get operation such auxiliary behavior as verifying the authority of the requester, or performing a translation of the information before providing it to the requester. However, should additional behavior or action be needed, beyond that already associated with the system operations, the schema of the database system must be modified to incorporate the new behavior or action, again a task of no small proportion.

Accordingly, it can be seen that a schemeless database system can provide a variety of advantages.

SUMMARY OF THE INVENTION

The present invention provides a simple technique for storing data items of varying forms and structures without requiring adherence to any specific schema. The invention accomplishes this technique by employing an object oriented program to create and store object instances of class types pertaining to the particular data item.

The invention utilizes a capability offered by the object oriented programming environment: using instance objects of pre-specified classes to represent variables of a user-defined data type. Broadly, the invention is an information storage system that includes a storage manager, a persistent store (e.g., disk storage or other permanent storage) that is administered by the storage manager, and an object catalog that contains the definitions of what the persistent store can contain in terms of object-oriented class specifications. Data items are kept in the persistent store as object instances of a type specified by information in the object catalog.

The invention is best utilized by a data processing system having some form of local or resident storage memory (e.g., for storing data and instructions), and a persistent store mechanism such as conventional disk storage. The object catalog is structured to contain object-oriented class specifications, defining the different types of data items maintained in the persistent store. Data items of a particular type are stored as a collection of object instances of a class specification contained in the object catalog. Each collection of object instances relate to data items that are of a particular category; for example, savings account data items as opposed to parts inventory data items (which would form another collection of object instances of a type enumerated by a class specification contained in the object category). Each class declaration in the object catalog pertains to one particular collection of data items, and includes the name of the class, its attributes, member functions, and base classes if any. Since the stored object instances may contain both data (attributes) and function, a collection of objects of the same type will correspond to data items of a same type; i.e., the object represents variables of a data type defined by a user. Thus, the system can store multiple collections, each separately defined by a class specification in the object catalog.

In use, a class specification, describing data items of a particular form desired to be stored, is designed and placed in the object catalog. Implementation code for any member functions declared in the class specification will be formed and also stored in the object catalog with the class specification. An instance object of the class type is created for each data item desired to be stored, and put in the persistent store by the storage manager. An application program needing to access data items from a particular collection of objects of a particular type issues a "get" request to the storage manager which first queries the persistent store to find the requested object instances, and returns it to the requesting application. The application may then call any member function that may be specified in the class specification contained in the object catalog to act on the data item (i.e., objection instance). When through, the application returns the object instance to the persistent store by requesting a "put" operation of the storage manager, and return the object instance to the database manager, which returns it to persistent store.

A further embodiment of the invention provides for attaching or otherwise associating collateral behavior to operations of the storage manager, using object-oriented programming techniques in conjunction with the database system of the present invention. According to this further embodiment, class specifiers describing handlers (i.e., code that, when called, will "handle" a certain event) are placed in the object catalog. Object instances of the handler class type are formed and added to the persistent store, using an addhandler operation of the storage manager. The addhandler operation will also associate the handler object instance being stored with storage manager operations on stored object instances of a specific class type. For example, if a "savings" class (for savings accounts) has been specified and placed in the object catalog, object instances of that class will represent savings data type objects for each particular "account" (e.g., Mr. Smith, Mr. Brown, etc.), forming a collection of savings objects stored in the persistent store. Particular operations of the storage manager (get, put, etc.) on the savings object in the persistent store can initiate use of one or more of the handler object instances to call member functions of the handler class to, in turn, launch specific collateral activity. Consider a request to the storage manager to retrieve a savings object instance (data item) by a get operation. Collateral activity associated with the get operation may include verification of the source of the request for the get. Objects of a type different from savings (e.g., objects of an inventory class specification) may have different handler objects associated with the get (or put, or other) operation of the program manager.

It will be apparent to those skilled in this art that the present invention provides advantages not believed present in present day storage systems. First is that data items of different forms may be stored merely by creating a class specifier to describe each form, and then creating and storing an object instance for each data item of each form. Second is that behavior native to data items of a particular form made readily available by the member functions declared in the class specifier for object instances that represent the data items merely by calling the member function to act on the data item.

A further advantage is the ease with which collateral activity can be attached to operations of the storage manager merely by specifying the desired activity by a class activity, adding an object instance of the class to the persistent store, and associating the object instance with a storage manager operation on object instances of a particular type. Removal merely requires deletion of the handler object instance from storage and erasure of the association. Modifications can be effected simply and easily by modifying the handler object instance itself, or by replacing the object with another.

These and other features and advantages of the present invention will become apparent to those skilled in this art by a reading of the following detailed description which should be taken in conjunction with the accompanying drawings.

DETAILED DESCRIPTION OF THE INVENTION

Figure 1:
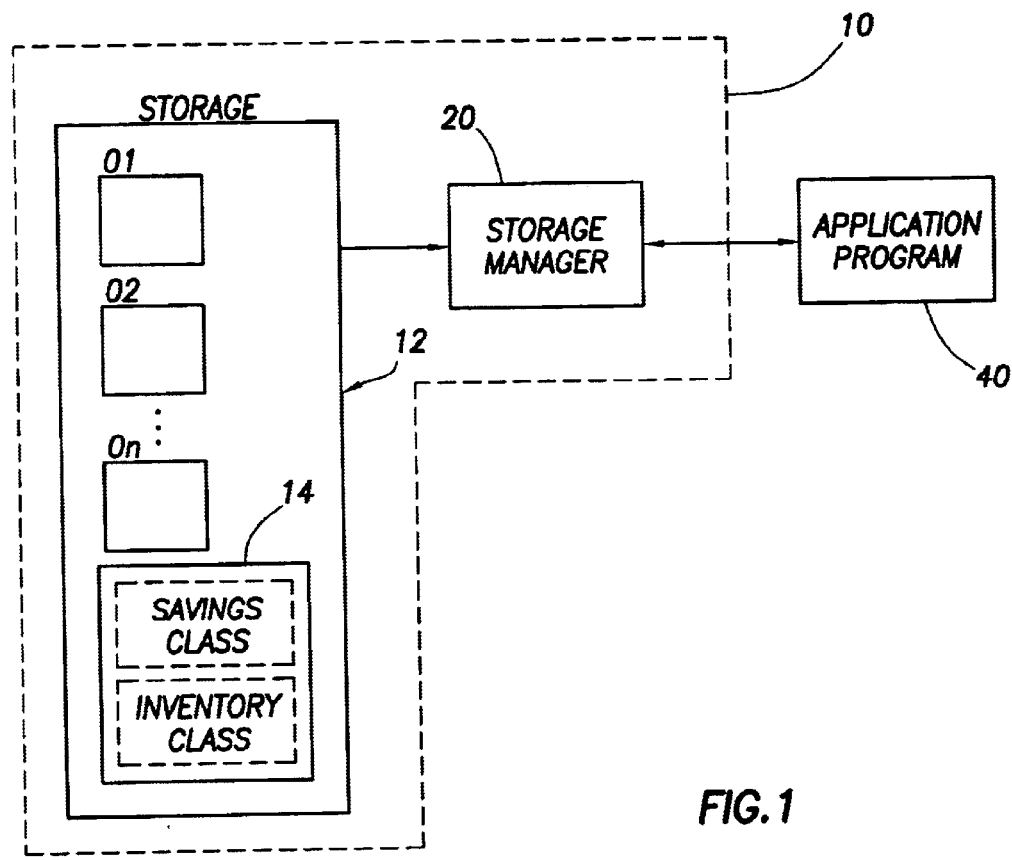
FIG. 1 broadly and diagrammatically illustrates the major components of the database system of the present invention.

The present invention is a storage system that operates to store data items in the form of object instances. The storage system is used by application programs running on a central processing system (not shown) having a memory system (not shown) that contains the application programs (or at least the presently executing parts thereof) together with any associated data structures to be made available to application program. The storage system, designated generally with the reference numeral 10 in FIG. 1, is shown as including three major components: a storage 12, an object catalog 14 contained in the storage 12, and a storage manager 20 (which, for efficiency, will reside in the memory of the central processing system). The storage manager 20 has access to and controls both the storage 12 and the object catalog 14. Preferably, the storage 12 is in the form of a persistent store such as, for example, disk storage or other permanent store. The object catalog 14, an object itself, can be maintained in the permanent storage, just as any other object (with handlers if used). Preferably, it is retained in memory of the central processing unit (not shown) for reasons of performance. The object code, also an object itself, resides in permanent storage, but preferably is called into memory for improved performance.

The storage 12 will contain one or more collections of object instances ($O1, O2, \ldots, On$), each collection being of a type defined by a class specifier found in the object catalog 14. As an example, FIG. 1 illustrates the object catalog 14 as containing two class specifiers: one for a class "savings" and another for a class "inventory." That is, for each collection of object instances, $O1, \ldots, On$, there will be a corresponding class specifier or specification contained in the object catalog, together with implementing object code for any member functions that may be declared in the class specification. The object instances kept in the storage 12 each represent a data item. Data items of the same type are represented by object instances forming one of the collections $O1, \ldots, On$. The object instances are available to an application program 40 through the aegis of the storage manager 20. Objects may be retrieved, replaced, or deleted from the storage 12 by the application program 40 respectively issuing "get," "put," and "remove" request messages to the storage manager 20. In response, the storage manager 20 will initiate requested "get," "put," or "remove" operation to retrieve a requested object from storage 12 (placing it in memory where it can be used by the requesting application program), or to return an object to the storage 12, or to remove the identified object.

Figure 4:
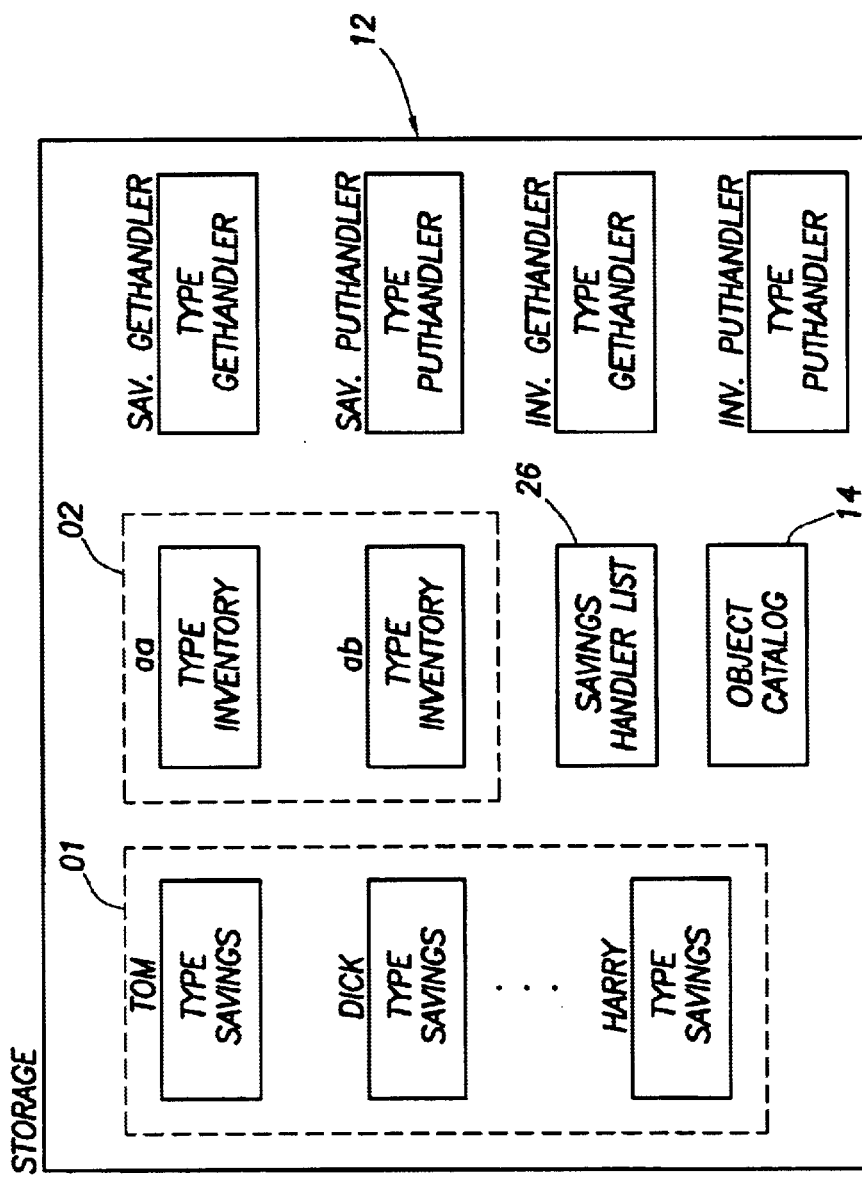
FIG. 4 is a diagrammatic representation of the content of the persistent storage used by the system illustrated in FIG. 1.

The object catalog 14 will contain, for each collection of object instances ($O1, O2, \ldots, On$; FIG. 4), code specifying the object class and, for each object class specification, the object code that will implement any member function(s) declared in any class specification. The persistent store further holds "handler lists" that are associated with specific ones of the class specifiers. As will be seen, each handler list delineates the collateral activity to be executed when particular operations of the storage manager 20 are performed or requested on an object instance.

There are other operations performed by the storage manager 20, such as addhandler (which adds an object instance of a handler type to the storage 12). Certain of these other operations are discussed below, and the source code listings for these operations are attached hereto in Appendixes A and B.

Figure 2:
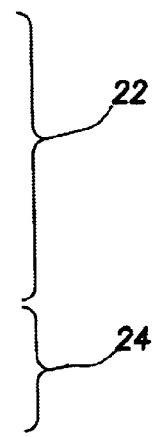
FIG. 2 is a representation of code, in the C++ language, of a simple class specifier.

FIG. 2 illustrates a simple class specification 22 for the class "savings." The class specification 22 is prepared, and stored in the object catalog 14, together with implementing code 24 (preferable in compiled form) for any of the member functions declared in the specification 22. The class specification 22 is shown as including a floating point attribute ("balance"), a constructor ("savings (0)"), and two member functions ("deposit (floatamt)" and "getbalance (0)"). Although the attribute balance is shown hidden (by the keyword private) so that it is accessible only to the member functions of the class, this is not necessary to the present invention.

The class savings specification 22 is preferably stored in the object catalog 14 in a form easily accessed by the storage manager 20, rather than in an ASCII form which can degrade performance by requiring the storage manager 20 to parse the terms. Accordingly, the class specification is stored in an electronic form.

As has been indicated among the operations performed by the storage manager 20 are a basic three to retrieve or remove a data item (object instance) from storage 12, or to return a data item to storage, in response to requests issued by an application program 40. In addition, collateral activity can be associated with one or another or any of these operations when requested by a particular application, but not when requested by another application. For example, suppose the application program 40 is one that manipulates savings accounts, and accordingly has need to get, put, and/or remove savings type objects (data items) from the storage 12. It may be desired that anytime a savings account application program issues a get request, the request be verified, and other activity implemented before the requested object is supplied the application for a program 40. This collateral activity is implemented by handlers. Thus, for get operations performed by the storage manager 20, there would be a class specification in the object catalog 14 for a "gethandler" that defines and describes the necessary attributes and member functions for performing the desired collateral activity when a get operation is requested of the storage manager 20. An instance of the gethandler class would then be defined and stored in the storage 12 for get operations performed for savings type objects.

Similarly, to associate collateral activity with put operations, a file containing the declaration and implementation of the activity (class "puthandler") would also be contained in the object catalog, and object instances of that class for put operations stored in the storage 12.

Figure 3:
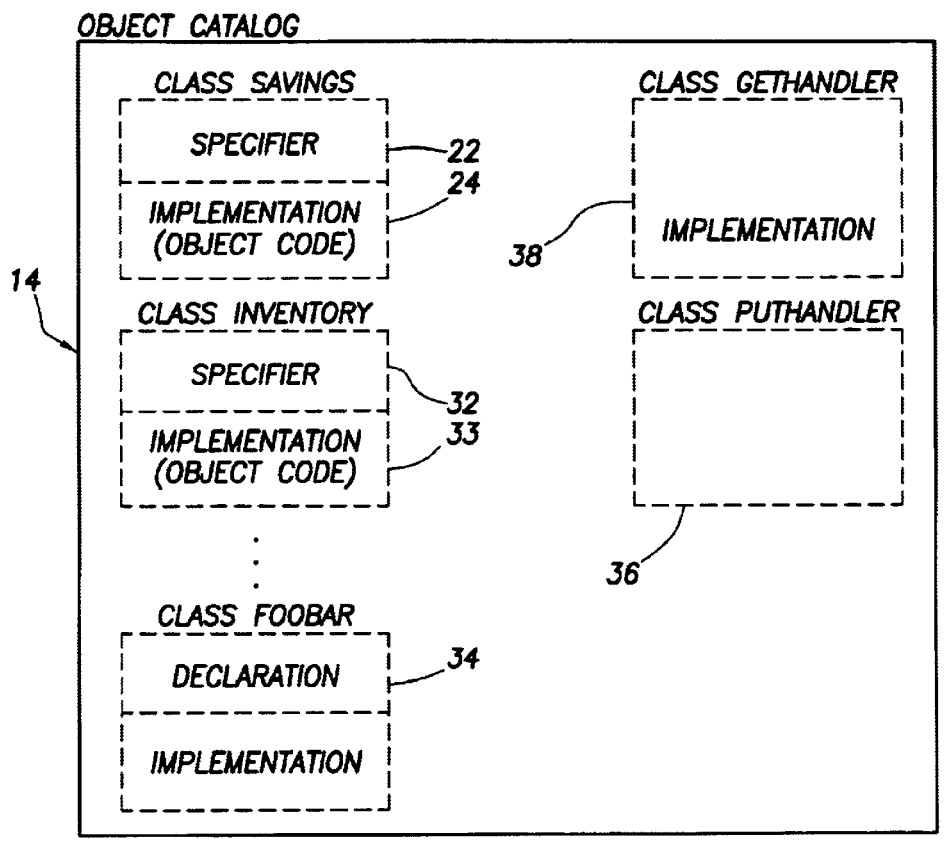
FIG. 3 is a diagrammatic representation of the content of the object catalog shown in FIG. 1.

A more definitive portrayal of the content of the object catalog 14 is illustrated in FIG. 3. FIG. 3 shows, in addition to the class specifier and implementation code 22, 24 for the class savings specification, the specifier and implementation code 32, 33 for the class inventory specification. The object catalog may also contain additional class specifications, as illustrated by foobar, gethandler, and puthandler specifications 34, 36, 38. Each named class specification contained in the object catalog 14 would, as illustrated, and like the class named savings, include at least a class specifier and implementation code for member functions declared in the class.

FIG. 4 illustrates the handler list 26 associated with the savings class specifier and implementation code 22, 24. Handler lists may be associated with a particular instance of a class, and/or all instances of a class. Thus, there may be a handler list associated with the class savings for each operation requested of the program manager 20 concerning objects in the storage 12 of a type savings; For example, there will be a handler list describing the collateral activity (verification, translation) for any get operations requested of the storage manager seeking savings type objects. There may also be a handler list for put operations for savings objects if there is to be initiation of collateral activity for any put operations requested of the storage manager. Each handler list contains the identity of an object instance of a handler type that, when called, will be executed to produce the desired collateral activity when a get or put operation is requested of the storage manager on a savings object. Since there is a different handler list for each separate storage operation, much more flexibility is achieved as to what collateral activity is initiated.

The collateral activity is performed by calling member functions to act upon object instances, stored in the storage 12, of a handler type. Thus, as with other object instances, or object instance collections, handler type objects must also be defined by a class specification and implementing member function code. Accordingly, the object catalog 14 will also contain the necessary specifiers and associated member function code for the different collateral activity handlers. Illustrated in FIG. 3 are two such specifiers: one for a puthandler class (36) and a second for a gethandler class (38). Depending upon what activity is desired, a single class specifier can be used for one particular storage manager 20 operation for all classes (savings, inventory, etc.); alternatively, single class specifier and implementation code combinations can be used to define a handler object for each storage manager operation on objects of a specific type. When a handler is invoked, it is supplied the name of the object, class specifier, a pointer to the object instance located in memory, and the name of the operation (i.e., requested activity: get, put, remove).

A handler can request that the operation or activity (e.g., get) be aborted. For example, a get operation may have a handler list that identifies three handlers. Those three handlers will be executed in sequence, and control returned to the get operation. However, if one of the handlers, for example, the second in the sequence, encounters an error that would preclude continued processing, that handler can abort the operation, in which case control would return (with an error condition) to the application that called operation.

Turning to FIG. 4, an example of what the storage 12 may contain is illustrated. The object collection 01 is shown as including a number of object instances of type savings such as TOM, DICK, and HARRY. Similarly, the object collection 02 may correspond to the class specification inventory 32 (FIG. 3), and object instances of that class (aa, ab, . . . ) would make up the collection. FIG. 4 also shows that the storage 12 will contain the handler object instances that may be associated with the various classes specified in the object catalog. Thus, for example, the collateral activity for the get and put operations of the storage manager 20 on objects of type savings have their object instances (sav. gethandler, sav. puthandler) maintained in the storage 12. In similar fashion, if there is also collateral activity for get and put operations of the storage manager 12 of (data item) object instances of the inventory class specification, the object instances (e.g., inv. gethandler, and inv. puthandler) for that activity is also kept in the storage 12.

The storage manager 20 is structured to perform, in addition to the get, put and remove operations, other operations such as adding handler object instances to the storage 12. As with other object instances stored in the storage 12, a desired handler class specification and member function implementation are prepared, coded/compiled, and stored in the object catalog 14. Object instances of the handler type are then constructed and added to the storage 12 using an addhandler operation of the storage manager 20. The addhandler operation, in addition to storing the handler object instance in storage 14, will also write the identification of the newly added handler object to the associated handler list of the appropriate class. If no such handler list exists, the addhandler will create one, associate it with the designated class, and add the handler object identification.

For example, assume that whenever the application program 40 issues a get request to the program manager for a get operation on an object of type savings such collateral activity as verification of the authority of the author of the get request is needed. As indicated above, the class specifier and implementing code ("gethandler") for such collateral activity would be prepared and added to the object catalog 14, describing the desired activity—if it does not already exist in the object catalog. The desired object instance (here, of a gethandler type) is prepared and the addhandler operation of the storage manager 20 requested to put the newly created handler object in the storage 12. The request will include an identification of the storage manager operation (get) and object instance of the type savings with which the handler object will be associated. The addhandler operation will, accordingly, write the handler object to the storage 12, and create a gethandler list with the identification of the handler object and write the list to the object catalog 14, associating it with the savings class specifier. If such a list already exists, the addhandler operation will write the handler object identification to that list.

Appendix A, attached hereto, is the source code listing that describes the operation of the storage manager 20 in the C++ language.

Figure 5:
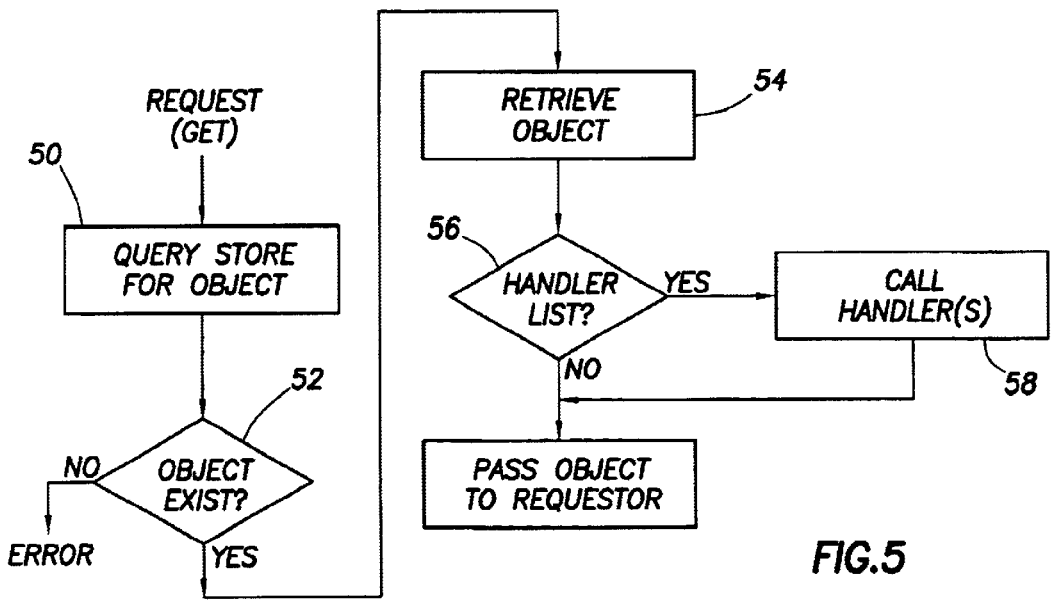
FIG. 5 is a flow diagram illustrating the operation of the storage manager to obtain an object instance requested by an application.

Operation of the storage manager 20 is illustrated in FIG. 5 with respect to a request by the application program 40 to "get" an object from storage 12. Continuing with the example discussed above, assume the application program 40 is a savings account program. Savings accounts of individuals are represented by objects (TOM, DICK, . . . , HARRY) of type savings are stored in the storage 14, as illustrated in FIG. 4.

Assume further that any requested get operation of the storage manager 20 is to initiate some collateral activity. Accordingly, a gethandler object (sav.gethandler) for implementing the collateral activity is created and placed in the storage 20—with the identification of that gethandler object added to the (get) handler list of the savings class.

Assume that the savings account application program 40 desires to deposit an amount in a savings account represented by the saving type object TOM in storage 12. Accordingly, the application program 40 will message the storage manager 20 with information describing the desired operation (get), object (TOM). The storage manager 20 will then, referring to FIG. 5, step 50, query the storage 12 for the appropriate object (TOM). If the object exists, the storage manager 20 will retrieve the object. (Actually, a copy of the object is retrieved.) If the query indicates that the object TOM does not exist, step 52 will be exited with an error signal being returned to the application program 40.

The storage manager 20 then queries the storage 12 for the handler list identifying handler objects that are to be involved for get operations on this object instance (i.e., here, TOM). If such a handler list exists, it will be retrieved by the program manager 20, and each of the gethandler objects identified in the list called for execution in turn (steps 56/58). When all gethandler objects have been executed, steps 56/58 are exited in favor of step 60, in which the storage manager passes the copy of the requested object (TOM) to the requester, the application program 40. The application program 40 can then call the "deposit" member function (see FIG. 2) on the TOM object (which is now in the application's memory) by executing the implementing code in the object catalog (also in memory) for that member function. The deposit has now been effected, and the object TOM must now be returned to the storage 12 with the changed content of the attribute balance of the object TOM.

Accordingly, the application program 40 will message the storage manager 20 with a put request, providing the storage manager 20 with the object TOM. (Actually, what is passed by the application program 40 to the storage manager 20 are pointers to the memory space managed by the application program containing the attribute, balance, of the object TOM.)

The storage manager, before returning the object TOM to the storage 12, will perform a puthandler operation which, in turn, will initiate the puthandlers operation to obtain any puthandler list associated with TOM object instance. If such a list exists, the puthandler operation will cause each of the registered puthandlers to execute, after which the object TOM is restored to the storage 12, now modified so that the balance has been increased by the deposit performed by the application program 40.

What is claimed is:

1. A database system for maintaining a store of one or more object instance collections each of an object oriented class type, comprising:

an object catalog containing for each class type a class specification that includes one or more attributes and member functions;

a database management facility for storing and retrieving the object instances, the database management facility operating to receive a request to retrieve an object instance contained in a one of the object instance collections to first search the object catalog for the corresponding class specification; and a list of collateral activity associated with at least the one object instance collection, the list identifying at least one collateral activity that is performed when the database management facility operates to retrieve an object instance from the one object instance collection in response to a received request.

2. The database system of claim 1, including a central processing system having a memory, the object catalog being maintained in the memory.

3. The database system of claim 2, wherein the list of collateral activity is maintained in the memory.

4. A method of maintaining a database system using object oriented class specifications and object instances, including the steps of:

maintaining a store for containing one or more data collections, each data collection comprising a number data items each represented by an object instance of a particular class type;

maintaining an object catalog that contains a class specification for each data collection, each class specification containing a description of each of the number of data items of such data collection;

providing a database manager operation that, in response to requests therefore, operates to retrieve, replace, or remove data items in the store;

maintaining in the store, and associated with the class specification for at least one of the data collections, a list of collateral activity to be performed for a one of the operations of retrieve, replace, or remove;

receiving at the database manager a request to retrieve, replace, or remove a data item in the one of the data collections;

searching the store for the associated list of collateral activity, and if found, performing the collateral activity;

executing the request at the database manager.

5. An article of manufacture comprising a storage system for maintaining a store containing one or more data collections, each data collection including a number of object instances of a particular class type, each object instance representing a data item, the storage system operating to:

maintain an object catalog that contains a class specification for each data collection, each class specification containing a description of each of the number of data items of the collection;

operate a database manger to, in response to requests therefore, retrieve, replace, or remove data items in the store;

maintain and associate with the class specification for at least one of the data collections a list of collateral activity to be performed for a one of the operations of retrieve, replace, or remove;

perform a predetermined collateral activity identified in the list of collateral activity when the database manager receives a request to perform the one of the operations to retrieve, replace or remove a data item from the one of the data collections.

* * * * *